United States Patent
Wallenius et al.

(10) Patent No.: US 7,161,925 B2
(45) Date of Patent: Jan. 9, 2007

(54) METHOD FOR CALL CONTROL IN INTELLIGENT NETWORKS

(75) Inventors: Jukka Wallenius, Helsinki (FI); Petteri Putkiranta, Espoo (FI); Sami Uskela, Helsinki (FI); Pasi Koljonen, Espoo (FI)

(73) Assignee: Nokia Corporation, Espoo (FI)

( * ) Notice: Subject to any disclaimer, the term of this patent is extended or adjusted under 35 U.S.C. 154(b) by 1019 days.

(21) Appl. No.: 10/091,224

(22) Filed: Mar. 1, 2002

(65) Prior Publication Data

US 2002/0176379 A1    Nov. 28, 2002

Related U.S. Application Data

(63) Continuation of application No. PCT/EP99/06458, filed on Sep. 2, 1999.

(51) Int. Cl.
*H04Q 7/28* (2006.01)

(52) U.S. Cl. ...................... 370/338; 370/352

(58) Field of Classification Search .......... 370/410, 370/358, 360, 400, 422, 328, 310, 338, 401, 370/352, 259, 522, 468, 351, 353–356, 395.1, 370/395.2, 395.21, 395.52, 395.6, 465, 466, 370/354, 461, 462, 493, 349, 389, 392, 385; 379/88.22, 88.23, 88.25, 196, 197, 198, 199, 379/200, 201, 357, 221, 219, 207.02, 215, 379/211, 230, 265, 266, 207, 220, 229
See application file for complete search history.

(56) References Cited

U.S. PATENT DOCUMENTS

| | | | |
|---|---|---|---|
| 5,751,707 A | | 5/1998 | Voit et al. |
| 6,131,024 A | * | 10/2000 | Boltz .................. 455/405 |
| 6,226,373 B1 | * | 5/2001 | Zhu et al. ............ 379/207.02 |
| 6,311,055 B1 | * | 10/2001 | Boltz .................. 455/414.1 |
| 6,321,096 B1 | * | 11/2001 | Lautenschlager et al. ... 455/461 |
| 6,333,931 B1 | * | 12/2001 | LaPier et al. ............ 370/385 |
| 6,442,169 B1 | * | 8/2002 | Lewis .................. 370/401 |
| 6,614,781 B1 | * | 9/2003 | Elliott et al. ............ 370/352 |
| 6,745,029 B1 | * | 6/2004 | Lahtinen et al. ........ 455/432.1 |
| 2001/0014614 A1 | * | 8/2001 | Lautenschlager et al. ... 455/553 |

FOREIGN PATENT DOCUMENTS

| | | |
|---|---|---|
| WO | 9730537 | 8/1997 |
| WO | 9835481 | 8/1998 |
| WO | 9934617 | 7/1999 |

* cited by examiner

*Primary Examiner*—Chau Nguyen
*Assistant Examiner*—Christopher Grey (57) ABSTRACT

The presentation of information identifying a calling user of a terminal device (MS-A) to a called terminal device (MS-B) in a communication involving a radio access network is triggered upon receipt of an incoming call; if triggered, the information is presented to a user at a man machine interface (MMI) of the terminal device; a user input is collected via the man machine interface (MMI) in response to the presentation, and the received call is controlled according to the collected user input. It becomes advantageously possible to initiate a retrieval procedure for calling party identifying information while the call is being controlled by a service control device and prior to the routing of the call to the called terminal device.

35 Claims, 3 Drawing Sheets

FIG. 1

METHOD FOR CALL CONTROL IN INTELLIGENT NETWORKS

CROSS-REFERENCE TO RELATED APPLICATION

This application is a continuation of International Application PCT/EP99/06458 having an international filing date of Sep. 2, 1999 and from which priority is claimed under all applicable sections of Title 35 of the United States Code including, but not limited to, Sections 120, 363 and 365(c).

FIELD OF THE INVENTION

The present invention relates to a method for call control by a called terminal device receiving a call via a communication network for intelligent network services. Particularly, the present invention relates to such an intelligent network (IN) supporting CAMEL (Customized Applications for Mobile network Enhanced Logic).

BACKGROUND OF THE INVENTION

Recently, the development of mobile telecommunication and the services offered thereby has made large progress.

Particularly, mobile telecommunication systems now also permit access to so-called intelligent peripherals or offer an access to the Internet. Additionally, with an increasing number of services offered, there also arises a need for, e.g., an individual configuration, for each respective user of a terminal device such as a mobile station, of the various services available, or an individual call control. Such an individual and personal configuration of services/call control in turn necessitates a corresponding interaction between the user himself and the network.

It is to be noted that, throughout the present specification, CAMEL and IN designates any solution in which a call, connection or session processing node contacts a service control function which issues instructions to the respective node. The contact to the service control function is based on a trigger information stored in the respective nodes. The trigger information may specify situations in the course of a call, connection or session handling. The service control function may be internally distributed. Moreover, the corresponding IN protocol could be any protocol between a controlling entity, such as a service controller (e.g. CAMEL Service Environment, CSE), responsive to a triggering from a call, and a session or connection processing node. The IN protocol may be e.g. an object oriented interface where the operations are object methods or invocations.

It is to be noted further that throughout the present specification, WAP and WTA designate any solution in which there is a content execution environment (user agent or client, respectively) at the terminal side and this environment is capable of controlling terminal (MS) functionalities such as call control, mobility management MM and user interface. Furthermore, the execution environment may receive content from the network spontaneously or it may be provided with references to content to be downloaded. The content may be hypertext, markup language code, any interpreted or even native or virtual machine code.

Currently, in intelligent networks (hereinafter also referred to as IN-networks), a user interaction is provided for by using in-band announcements and by relying on DTMF (Dual Tone Multiple Frequency) collection.

However, such procedures are often cumbersome and slow from a viewpoint of the user, especially in case the services are used frequently.

An alternative resides in the use of USSD (Unstructured Supplementary Services Data) based user interaction, but the problem with USSD is that USSD messages in itself (without WAP content) do not specify the formatting of the data to the user and the prompting. Similarly, with USSD more complex user dialogues are not possible. For instance, it is difficult for the user to enter multiple information elements at a time in one USSD response, e.g. the user would have to enter delimiters after each information element.

Also, a WAP (Wireless Application Protocol) concept is currently being investigated. According to the concept of WAP, a browser means or so-called user agent and/or client is specified for a terminal device (e.g. mobile station MS). The browser means also supports a WTAI (Wireless Telephony Applications Interface), which enables WAP WML scripts (Wireless Markup Language scripts) or Java scripts as a kind of executable instruction sets or executable program, respectively, to interact with functions of the mobile station such as call control orientated functions. This means, that WML scripts receive event indications from a terminal and can request operations to be performed by the terminal. According to WAP, also applications are supported, according to which a WAP server at the network side providing some content to the terminal side browsing means (user agent) can push WML pages (comparable to HTML pages) (HyperText Markup Language) to the terminal, i.e. to the terminal's user agent.

However, up to now the WAP concept was not defined in terms of providing a user interface between a subscriber terminal and an intelligent network.

Moreover, hitherto, call control functions were implemented which are known as CLIP (calling line identification presentation) and CNAP (calling name identification presentation).

However, these functionalities could not be implemented in case a calling subscriber terminal is a fixed network terminal and were thus rather inflexible and not particularly user friendly.

Also, with previous solutions, control channels of an access network forming part of the intelligent network had to be established for call control signaling purposes, and in case of an incoming call being rejected, those control channels and corresponding allocated access network resources were wasted which could have been used otherwise.

SUMMARY OF THE INVENTION

Consequently, the object of the present invention resides in the provision of a method for call control by a called terminal device receiving a call via a communication network for intelligent network services, which is free from the above mentioned drawbacks.

According to the present invention this object is achieved by a method for call control by a called terminal device receiving a call via a communication network for intelligent network services, said network comprising a service control device and a server device communicating with each other via an interface, said service control device being connected to at least one service switching device establishing communication via at least one radio access network with said terminal device, and said terminal device being provided with a browsing means adapted to communicate with a user of said terminal device via a man machine interface means, and adapted to communicate with said server device, the method comprising the steps of: triggering the presentation of information identifying a calling user of a terminal device to the called terminal device upon receipt of an incoming call; if triggered, presenting said information to a user of said called terminal device at said man machine interface of said terminal device; collecting a user input via said man machine interface in response to said presentation, and controlling said received call according to said collected user input.

Accordingly, with the present invention being implemented, it becomes advantageously possible to provide a flexible and user friendly method of call control at the called terminal device. Moreover, with the present invention, the use of radio resources for call control signaling is limited to those allocated to the WAP bearer. Hence, there is a benefit that any other radio resources other than the WAP bearer are not used during such user interactions.

BRIEF DESCRIPTION OF THE DRAWINGS

The present invention is now described herein below in detail by way of example with reference to the accompanying drawings.

DETAILED DESCRIPTION OF PREFERRED EMBODIMENTS

Hereinafter, the present invention is now described in detail with reference to the drawings.

Figure 1:
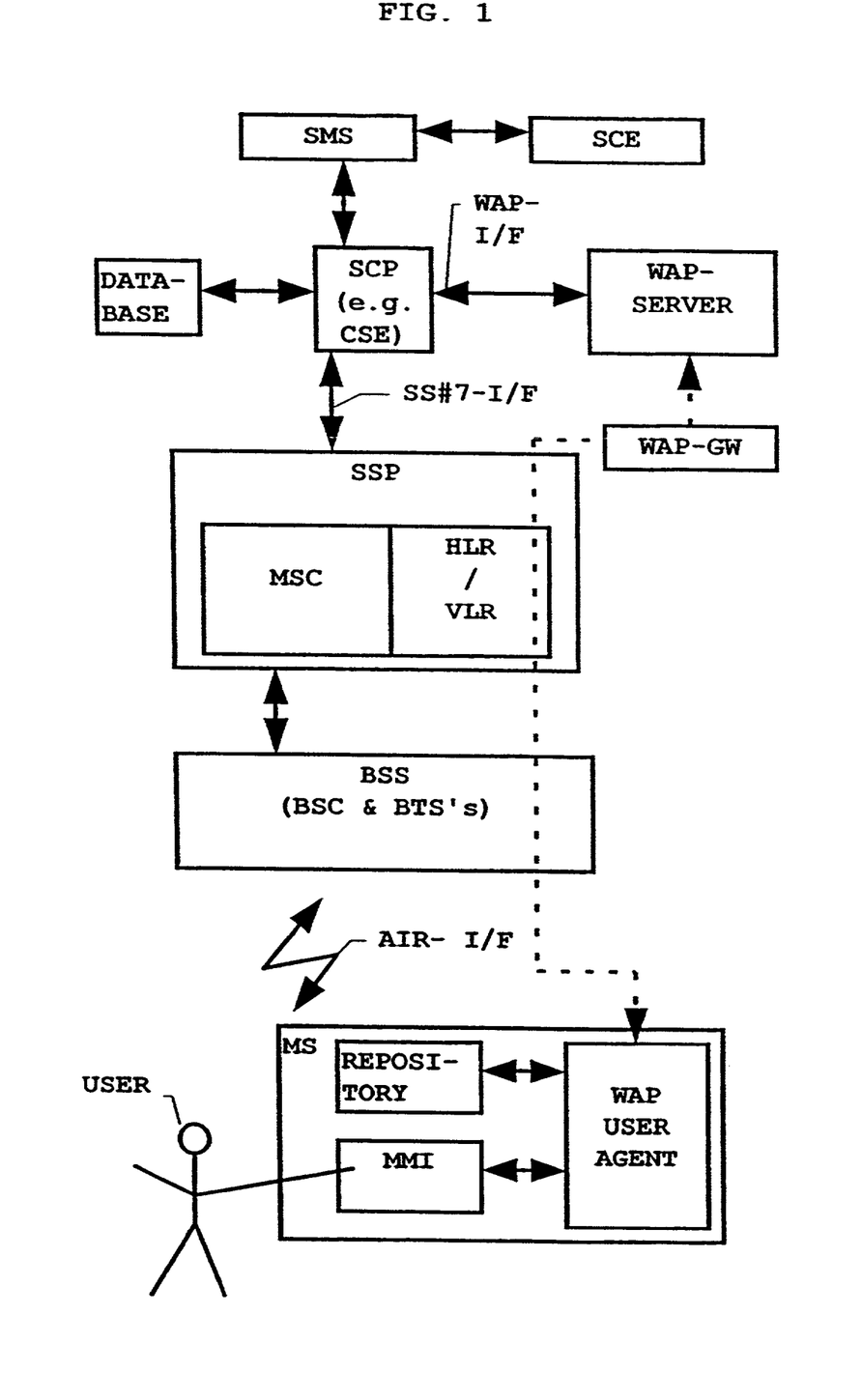
FIG. 1 shows a block diagram of a structure of an IN network.

For still better understanding, the architecture of an intelligent network (IN network) is briefly described at first with reference to FIG. 1.

As shown in FIG. 1, an intelligent network as a communication network for intelligent network services comprises different IN network entities. For easier understanding, the following explanations omit the add-on of "entity" but rather refer to the network entities by their functional description. Also, as is current practice in standardization documents, the entities are referred to by using the abbreviation thereof after having been defined once.

Now, among these, a service creation environment SCE communicates with a service management system SMS. The SMS in turn communicates with a service control point SCP. In a CAMEL network environment, the service control point is also referred as CAMEL service environments CSE. Associated to the CSE, a WAP server is provided for, which is connected to the SCE vie a WAP based interface WAP-I/F.

Although in FIG. 1 the WAP server and the CSE are illustrated as being separated from each other, they can be implemented in a single network node only, without necessitating any change to the present invention. Moreover, FIG. 1 illustrates a database being connected to the SCP (CSE). However, this is not a prerequisite for the present invention, but merely relates to a specific embodiment thereof to be described later.

The SCP (or CSE in case of CAMEL) communicates via an interface SS#7-I/F adapted to the signaling system No. 7 with components of a PLMN network (Public Land Mobile Radio Network). Namely, the SCP communicates with a service switching point SSP. Such a SSP may be represented in a PLMN by a mobile switching center MSC, to which a home location register HLR and/or visitor location register VLR can be associated.

The MSC as a SSP communicates with a base station subsystem BSS consisting of at least one base station controller BSC controlling at least one base transceiver station BTS.

A respective BTS communicates via an air interface AIR-I/F with a terminal device such as a mobile station MS operated by a user.

More specifically, such a terminal MS, among other means (not shown) is, in connection with the present invention, provided with a WAP user agent (client) or WAP browsing means, respectively. Generally, a user agent is any device adapted to interpret resources. The WAP user agent is adapted to communicate with the user via a man machine interface means MMI. Additionally, the WAP user agent is adapted to access a repository associated thereto. The repository is a persistent storage container as a kind of memory means storing WTA event catalogues and other pre-loaded WTA contents in connection with data used in connection with WAP. Also, the terminal comprises (not shown) a SIM module (subscriber identity module) and (not shown) transceiver means for transmitting/receiving data via the air interface to/from the PLMN network part of the IN network.

Finally, the WAP user agent communicates (indicated by the dotted line in FIG. 1) by an intermediate WAP gateway WAP-GW with the WAP server associated to the CSE. It is, however, to be noted that although a WAP gateway is usually provided for, it is not absolutely necessary in every case, as the WAP server can be adapted to provide WML content directly to the user agent.

The communication path illustrated by the dotted line "passes through" the PLMN network, while however the information transmitted thereon (i.e. using the WAP bearer) are transparent for the PLMN network and can be regarded as being exchanged between the WAP gateway and the WAP user agent directly.

It is to be noted that FIG. 1 merely illustrates a single terminal MS only. Of course, more than one terminal devices MS can be present in the network. For the subsequent explanation, the one illustrated in FIG. 1 is assumed to be the called terminal (also referred to as MS-B), while a not shown terminal is a calling terminal (also referred to as MS-A). Still further, in the case it is assumed that the both users are subscribers in the same network and that they are present in the same network area such that when communicating via the network with each other, they communicate via the same SSP entity and, incidentally, also the services for MS-A and MS-B are controlled by the same SCP. Stated in other words, generally, which SCP is contacted is dependent on the identity of the user. The identity of the SCP is stored in a CAMEL service information (CSI) in subscriber data within registers. In any case there may be two SCP's involved. The fact that both subscribers are sometimes controlled by the same SCP is a pure coincidence based on the same SCP address being stored in each subscriber's subscriber data in the home location register HLR.

Also, when describing a corresponding signaling between the above introduced devices in order to implement and/or carry out the present invention, in the respective Figure, those components as briefly explained in connection with FIG. 1 are schematically shown with the corresponding signaling over time, i.e. signals communicated therebetween, being indicated as arrows, and the components are denoted with the same reference signs.

According to embodiments of the present invention as described below, an incoming call (originated from a calling terminal) triggers the control of the call to a service control function, obtains information on the calling party (name, picture, customer data) from an external server based on the calling user identity information (calling number) available in the call set-up information, and takes contact to the called terminal receiving the incoming call. Thus, the terminal such as a mobile station MS is contacted using a WAP connection (WAP bearer) to the terminal to which the call has been directed. Then, the called terminal receives, via the WAP connection, information regarding the incoming call such as for example the origin of the call (identity of the calling terminal/subscriber) and may control the call on the basis of the thus received information.

Stated in other words, according to the present invention, a preliminary calling party greeting or information presentation is issued to the called party prior to or at incoming call connection, enabling the called party to control the incoming call.

The invention will now be described with reference to the individual embodiments.

First Embodiment

According to a first embodiment, a calling terminal (MS-A) issues a call to a called terminal (MS-B). Then, at the called terminal this incoming call triggers a query. That is, upon receipt of the incoming call, the called terminal is triggered to issue a request via the network to the calling station to provide some information regarding the calling station. The provided information may reside in the calling terminal's identity (e.g. expressed by the calling terminal line number or telephone number, respectively), or in some billing information to be presumably charged to the called terminal (e.g. in form of some tariff information as a price per minute of the call), or any other information suitable to characterize the incoming call to be established.

Being aware of the thus provided information, which is transmitted to the called terminal via a WAP connection established to the called terminal, the terminal (and/or the user of the called terminal having learned the information which was for example indicated to him via the man machine interface of his terminal) can then determine whether or not he is willing to accept the call. Of course, accepting or refusing a call may not be the only options available for call control of an incoming call. Also, an option could reside in rerouting the incoming call to another terminal, and/or a voice mail address, etc.

Particularly, the determination can be made automatically at the terminal side or "manually" by the user of the terminal himself. For example, the terminal may have provided a storage means storing a list of terminal identities a connection to which is to be refused. Then, an incoming call having as a call information the identity of the calling terminal could automatically be barred. Alternatively, the calling terminal's identity (telephone number) can be displayed to the user on a display provided at the man machine interface MMI of the called terminal, and the user can decide whether to accept the incoming call or not manually on a per call basis.

Of course, each call the terminal/user refused to accept could be stored in the storage means, so that the invention also provides the possibility that the user gets a list of barred incoming call attempts.

The first embodiment of the present invention could thus be regarded as being similar to the known CLIP feature (Calling Line Identification Presentation).

Thus, in the first embodiment, the information related to the incoming call, i.e. referring to the calling terminal is provided to the called terminal by the SCP entity via the WAP server and the WAP gateway (see FIG. 1) to the WAP user agent (client) located at the called terminal side.

Second Embodiment

The second embodiment described below is similar to a CNAP method (Calling Name Identification Presentation).

To this end, each line identification (calling line identification CLI) is allocated to a respective name of the subscriber subscribed to the respective CLI. This represents a simplification for recognizing the calling terminal's/subscriber's identity, since the called terminal's user need not remember a number of a user but clearly receives a name indication of the calling party.

To this end, as shown in FIG. 1, an external database is connected to the SCP entity. Note that although the database is shown as being externally provided, the database may of course be internally provided at the SCP entity. The database may be a separate (external/internal) memory, or a memory area of a memory used also for other purposes at the SCP entity. The database memory/memory area needs only to be separately addressable for the purpose of the present invention. The database contains information regarding a respective calling terminal/subscriber. The information may be present in form of the name, or may assume a stored (digital) photograph of the user, or may reside in a web page address (URL address in Internet) of the user. Thus, in response to the triggering of the call from an SSP, the SCP entity contacts the external database, and reads out respective information stored therein in relation to the calling terminal subscriber (defined by its CLI or specified by the respective URL storage address for the terminal in the database. Note that the URL can be derived from the CLI, if necessary). The read out information is subsequently forwarded to the called terminal via the WAP connection (WAP bearer). Similarly to the first embodiment, the user of the called terminal may manually (or the terminal as such may automatically) decide, based on the received information, which call control action is to be taken (i.e. accept/reject/reroute the incoming call).

The above concept underlying the second embodiment will be described in detail herein below by way of examples.

According to a first example alternative, a respective (calling) subscriber terminal is identified by a URL, i.e. an address, at which address the information describing the incoming call and/or the calling subscriber is stored. The information consists for example, as mentioned above, of the subscriber's name, or his/her picture or Internet homepage address. This URL containing and/or pointing to the information can be conveyed to the CSE entity (SCP) associated to the called party using for example user-to-user-signaling. This user-to-user-signaling can be intercepted to the CSE from the GMSC T-BCSM (GMSC=Gateway Mobile Services Switching Center, a MSC providing access to another network; T-BCSM=Terminating Basic Call State Model). It should be noted that in addition to the called party GMSC also any MSC or SSP switch that can be in communication with the called party terminal using the WAP connection can be used. Therefore, the presentation service can also be implemented by an operator other than the called party operator. In the above cases, the information fetched from the calling party address identified by the URL can be loaded to the WTA server, or the WTA server forms a WAP content which content contains a reference to the calling party URL.

According to a second example alternative, the information (e.g. the picture) is sent such that the calling party network operator stores one or more data records (data items) per calling party number to which a reference to a URL can be stored. One of these addresses (URL's) can be (selectively) attached to the content presented to the called party when there is an incoming call to the called party from that particular calling party. The calling party can thus select the address (URL) to be presented, for example by using a called party number prefix. Note, that if there is only one URL available per calling party, then a prefix can be used to indicate whether the URL should be presented at all.

When the call arrives at the GMSC associated to the called party's terminal, the call triggers to the CSE a calling party information presentation service. The CSE then contacts the calling party operator SCP (or CSE) which retrieves the URL selected by the calling party by means of attaching the above mentioned prefix. Note that this URL represents only the URL reference, i.e. the storage address and not the content as such. The URL is sent to the WAP server (WTA server), which either retrieves and attaches the content addressed by the URL to the content presented to the called party, or simply stores within the content presented to the called party a reference to the URL, which causes the called party user agent to expand the calling party URL received (i.e. fetches the content addressed thereby). It should be noted that in the above description the tasks performed by the SCP and WAP server (WTA server) can be dispensed to either SCP or WAP server freely. It is, for example, equally possible that the SCP performs only the control of the call in the SSP while the WAP server when invoked by the SCP performs all information (URL or content) retrieval from external servers.

In an alternative sub-embodiment, the SCP associated to the calling party network operator does not need to be contacted at all. Namely, it is possible that the URL to be presented to the called party is derived from the calling party number directly. For instance, the operator prefix in the calling party number can be used to determine a known operator content server and the rest of the calling party number can be used to determine a specific content within the known content server. The term prefix used herein above rather means a content selector which can be anything that identifies the fact that the greeting content is to be presented. Currently, it can be a prefix, infix, or postfix within the called party number. If a prefix is dialed by the calling party, it may have to be modified into an infix by the calling party switch to facilitate routing in the communication network.

In a still further sub-embodiment, the calling party URL can be provided by the calling party directly in the call set-up information. For example, the calling party URL can be provided in user-to-user signaling either automatically by the calling party terminal in accordance with predefined user settings or it can be entered by the user during call set-up. The URL provided by the user is conveyed in the call set-up signaling to the called party MSC which triggers to the SCP. The URL contained in user-to-user signaling is provided to the SCP. The SCP can forward the URL to the WAP (WTAI) server where it is handled as previously described.

In still further refined implementations, the user-to-user signaling may be replaced with a call processing script (which is a kind of user-to-service signaling) providing call processing instructions from the calling party for e.g. the SCP. Such a kind of scripts is used in association with IETF session initiation protocol. In any case, the call processing script is carried in call set-up signaling to the MSC. When provided by the MSC to the SCP, it may contain an instruction line to push a given content (pointed to by a URL specified in the instruction line) to the called party. The calling party URL is extracted from the instruction line. The SCP can forward the URL to the WAP (WTAI) server where it is handled as previously described.

Figure 2A:
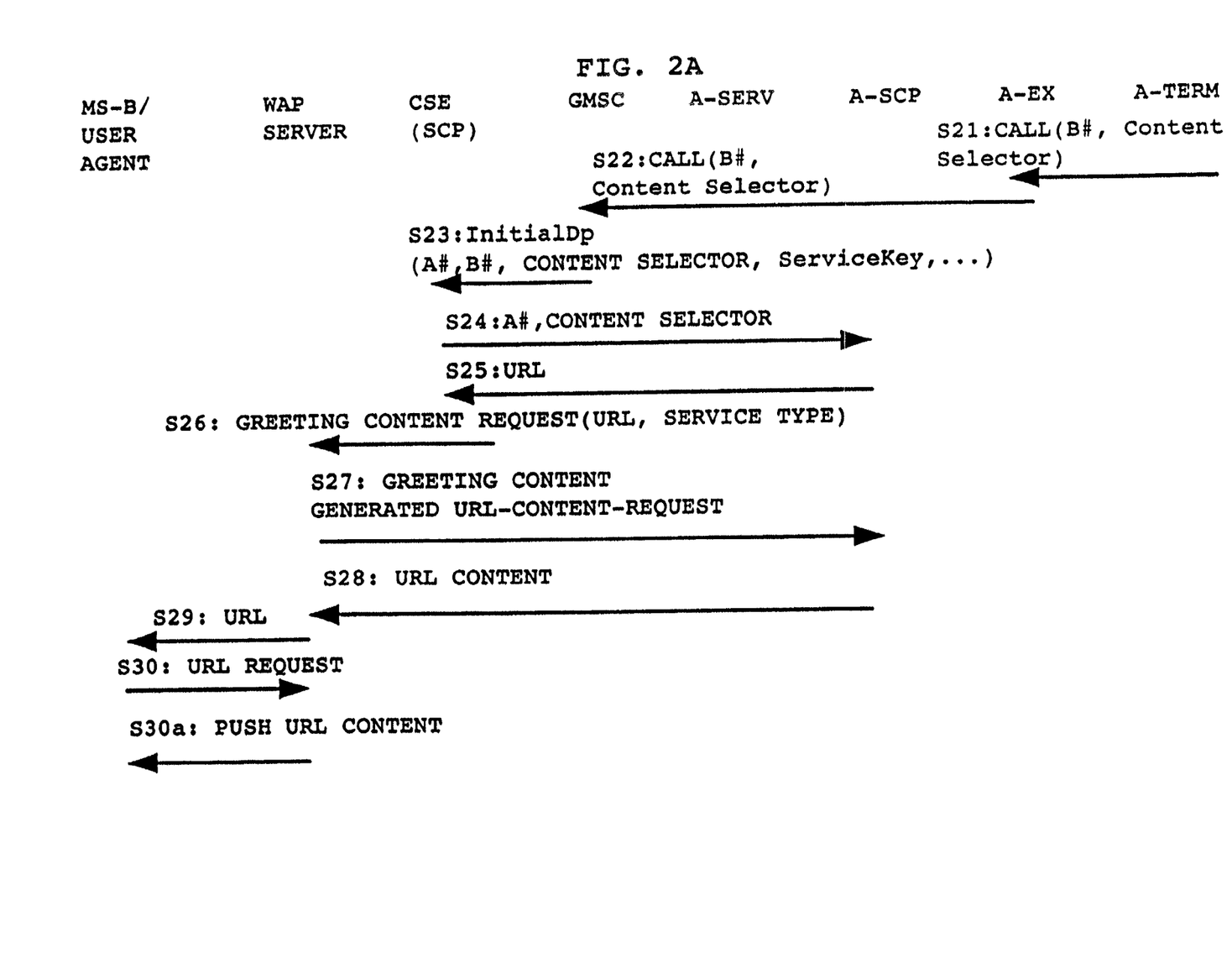
FIGS. 2A and 2B together show a signaling scenario for signals exchanged between network entities and terminal devices according to an embodiment of the present invention.
Figure 2B:
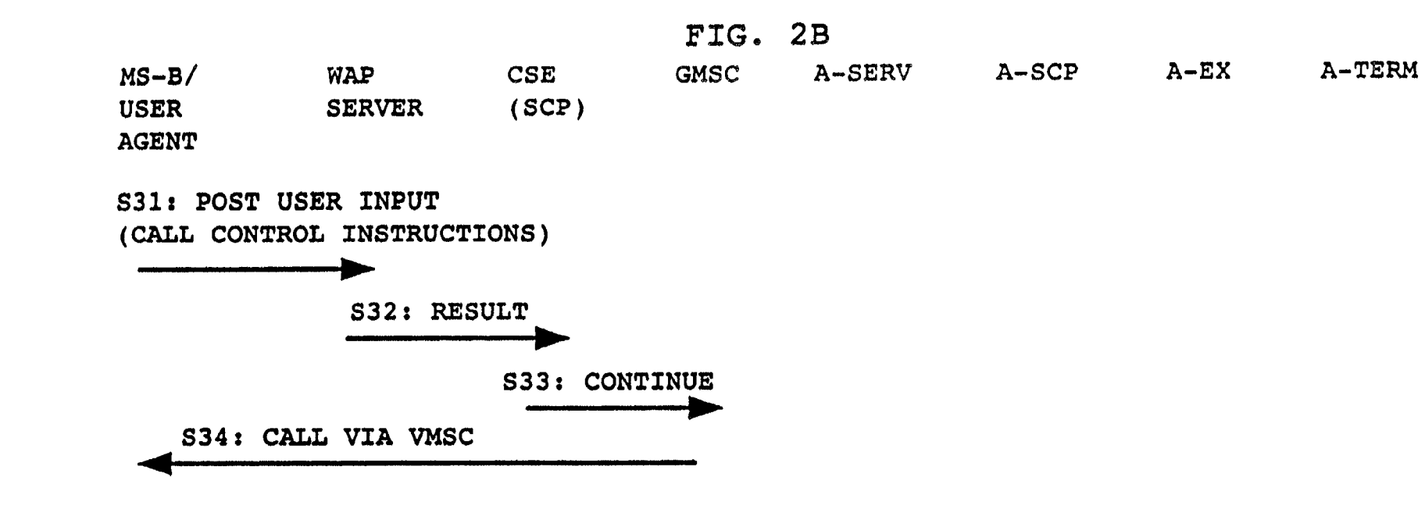

This is exemplified now with reference to the signaling diagram of FIGS. 2A, 2B. In the signaling diagram, the same network entities as those shown in FIG. 1 are denote by the same reference signs. Note that A-TERM in FIGS. 2A, 2B denotes the calling terminal, which need not be a mobile terminal but can also be a terminal of a communication network different from a mobile communication network. Likewise, A-EX denotes an exchange associated to the terminal A-TERM (in case the calling terminal is a mobile terminal in a mobile communication network, then A-EX may be a MSC, i.e. a VMSC and/or a GMSC associated to the terminal). A-SCP denotes a service control point entity associated to the calling terminal, and A-SERV denotes a WAP server for the calling terminal A-TERM, and associated thereto the above mentioned database which contains the data entries/data items identifying the calling user such as his name, image etc. is provided. Note that in case the calling terminal A-TERM is a mobile terminal in a mobile communication network and the calling A-TERM and the called MS-B/UA terminal are both in the same part of the communication network, A-SCP and CSE (SCP) can be the same network entity. However, for the sake of a most general explanation, it has been assumed that here they are different entities.

In step S21, the calling terminal A-TERM issues a call establishment message to the associated exchange A-EX. The call includes, apart from the called terminal number B#, a content selector, which has been selected by the user of the calling terminal to present a specific identification contents to the called terminal MS-B. In step S22, the call establishment message is forwarded from the exchange A-EX to the GMSC of the communication network of the called terminal MS-B.

In response to the receipt of the call establishment message and the HLR inquiry revealing the fact that IN services are indicated in subscriber data for the called party, the GMSC issues an InitialDp message, step S23, to the CSE (SCP) of the called terminal. The triggering to the CSE can also be based on the presence of an indicator in the call establishment message such as a specific indicator in the number #B such as a prefix. The presence of the indicator can be an additional criterion for the triggering. The InitialDp message contains the calling terminal's number A#, the selected content selector for identifying terminal A-TERM to the called terminal MS-B (which is identified by its number B#), a service key and other information. The content selector can be anything that identifies the fact that the greeting content is to be presented. Currently, it can be a prefix, infix, or postfix within the called party number. If a prefix is dialed by the calling party, it may have to be modified into an infix by the calling party switch to facilitate routing in the communication network.

Then, step S24, the CSE contacts the A-SCP based on the calling terminal's number A#, and based on the content selector requests the URL allocated to the specific content selector. In a following step S25, the A-SCP replies to the CSE by forwarding the URL address allocated to the content selector.

The CSE issues, step S26, a greeting content request containing the URL and the service type to the WAP server. Based on the information of the thus received URL (address), the WAP server then, in step S27, generates a greeting content. The greeting content may be formed either so that the WAP server retrieves the content associated with the calling party URL from A-SERV or that the WAP server embeds just the calling party URL (reference) to the greeting content. In FIG. 2A, it is assumed that the content associated with the calling party URL (URL content) is retrieved, step S28, to the WAP server from the A-SCP in response to a greeting content generated and containing a URL-content-request (step S27). Then, the WAP server relays, step S29, the URL address (related to the greeting content generated) further to the called terminal MS-B and the associated WAP user agent (WAP client/WTA client). The URL related to the greeting content may be carried in a WTA service indication.

In a followup step S30, the user agent then retrieves (requests) the greeting content referenced to by the received URL, and in a step S30a, the WAP server pushes the URL content to the user agent of the terminal MS-B.

The obtaining of the greeting content to the user agent can be simplified so that a simple content push from the WAP server to the user agent is used instead of the WTA service indication and the following content retrieval. The content push, however, may in some embodiments be issued via a push proxy gateway, if content translation is required.

The thus received content of the URL is then indicated to the user of the called terminal MS-B via the man machine interface. Dependent on the presented contents, the user may decide which action is to be taken, i.e. whether the incoming call is to be accepted/rejected/rerouted or the like. Also, not only the content of the URL can be displayed to the user, but dependent on the service type, also the possible actions available to be selected.

The user then operates the man machine interface MMI, e.g. by depressing a corresponding key to select the selected action for call control, and the thus obtained input of a call control instruction is posted to the associated WAP server, step S31 of FIG. 2B. In step S32, this result is forwarded further to the CSE (SCP) of the called terminal. Dependent on the received result, the CSE then initiates necessary steps for call control. In the illustrated example, it is assumed that the user input was "accept call", and then in step S33, the CSE instructs the GMSC to continue with the call, and the call is routed, step S34, via the GMSC/VMSC up the called terminal MS-B.

The selections done by the user before step S31 and forwarded to and received by the CSE can be interpreted in various ways. Generally, the problem is that the called party SCP must be able to receive and interpret the instructions issued by the content. The content stored at the calling party content server may not know about the called party SCP and its call control mechanism.

The content pointed to by the calling party URL retrieved to the user agent may be modified and completed by a called party operator server. This modification may occur, for example, in the WAP (WTA) server or called party SCP retrieving the content pointed by the calling party URL. Alternatively, the content request and response may be routed via a so-called proxy server which modifies the content retrieved. In any case, the content specified by the calling party may contain macro instructions relating to the desired call control actions (release call, give specified announcement). These macro instructions are expanded by the called party network operator (either in the WAP (WTA) server or by the proxy server via which the retrieval of the calling party URL request and response is routed. The expansion may be network operator specific so that the called party SCP can interpret the instructions. For example, release call may be expanded to a HTTP (HyperText Transfer Protocol) posting method with specific parameters to the SCP or WAP server URL. When the called party makes a selection, the expanded macro instruction causes an indication to the called party SCP.

The content pointed to by the calling party URL may basically be an arbitrary text document describing the characteristics of the content to be generated by the WAP server, it may describe for example pictures to be presented, the selection to be made available to the called party and the call processing to be executed (announcements, call continue, call forwarding, call release) as a result of the selections made. In any case, the WAP server translated the text document into executable content to be pushed to the called party terminal.

It should be noted that throughout the present specification, the expression "greeting content request" means a request to the WTA server (or a WTA interface or a WAP push functionality within the CSE) to generate a given content (WAP WML deck or HTML page, for example) which describes the presentation of the calling party information to the called party. The content also comprises the control aspects like a menu for the called party to make (call control) selections regarding the incoming call. The content may be generated by e.g. fetching a template WAP WML, HTTP page or JAVA script. To such a template, there is later on embedded the information retrieved from the external server (i.e. URL content) It should further be noted that the WTA server may also be a logical entity within the CSE like a WAP push/WTA interface handler functionality. The URL content retrieved in step S28 may be e.g. a GIF or JPEG picture of the calling party. Alternatively, the URL content may be a clip of a WML document specified by the calling party.

In the third embodiment (to be described later), the information retrieved from the external server, such as a customer database entry, may be similarly embedded into a template.

In a further sub-embodiment, the generation of the content generated in the WAP server to be presented to the called party, can involve the retrieval of content from several sources that are determined from call set-up information available such as calling party number, extra digits included in the called party number and user-to-user signaling data. The determination may involve servers, e.g. translating calling party number into calling party URL. For example, with reference to the content selector, for example a calling party can store a multitude of pictures which are selected by the calling party and the storage address thereof is mapped to a URL for selection according to the following example. In case of an assumed calling number of +358 40 591 6629 and a called number 0951121*2#, where +2# denotes an information (e.g. image) at a sub-address number 2, this information is mapped to the following URL address: http://www.sonera.fi/ident/5916629/2 which is given as an example here. One of the sources may provide picture or video clip data, while the other provides the selections and call control made available to the called party.

In a somewhat less complex sub-embodiment, the content pointed to by the calling party URL is simply embedded into a default template form by the called party WAP (WTA) server. The default template form contains the call control sections and the related content which communicates with the called party SCP.

If the calling party specified content is invalid and does not contain any valid instructions to the called party SCP or the called party does not make any selections (as regards call control) in a specified time, the call can be treated according to default treatment, e.g. the call could be completed as normal. Additionally, the calling party could be notified of the occurrence of the error.

Third Embodiment

According to the second embodiment as described hereinbefore, the database query to obtain the calling subscriber identification information such as his name/photo etc., may have been carried out by either by the WAP user agent arranged at the called terminal side or so that the WAP server retrieves the calling subscriber identification information to the WAP server before issuing a content push (WTA service indication or WAP content push) to the user agent.

Alternatively, according to the third embodiment of the invention described in the following, a query to a database storing information other than internet content is described. The database query can be effected already by the WAP server associated to the called terminal. Basically, with regard to the signaling diagram depicted in FIGS. 2A, 2B, this would mean that steps S27 to S29 could be omitted and that the signaling would come from step S26 immediately to step S30.

This would result in a somewhat increased signaling speed and reduced signaling amount in order to present the calling terminal identification information to the called terminal's user.

In consideration of the similarities of the signaling involved in the second and third embodiment, respectively, the third embodiment is described below without referring to a particular drawing exemplifying the third embodiment.

The signaling scheme involved in the third embodiment can be summarized as follows.

Firstly, a call setup is signaled from the calling terminal (A-TERM) via an associated exchange (A-EX) to the exchange such as a MSC and/or GMSC of the called party (MS-B/UA). Based on the adopted call setup signaling format, the MSC recognizes or detects that the call control has to be diverted to the WAP server. This means that then, the calling line identification CLI such as the calling terminal's telephone number (A#) and/or the calling terminal's URL address is transferred to the WAP server, if the called subscriber has a CNAP functional feature provisioned and in an active state.

This CLI transfer can be implemented either Straight forward from the MSC/GMSC to the called terminal.

Thereafter, upon receiving the CLI of the calling terminal, the WAP server initiates a database query to obtain the (more detailed) information concerning the calling terminal and subscriber such as his name/photo etc.

A content of the thus obtained information representing the result of the database query is generated. Then, a URL referring to the content generated is included in a service indication message. The service indication is sent from the WAP server to the WTA client i.e. the WAP user agent at the called terminal/called subscriber's mobile terminal to inform the called subscriber (via the man machine interface MMI) of the incoming call and of the origin of the call/identity of the calling subscriber by a suitable indication.

The content referenced in the service indication is retrieved to the user agent. The content (for example displayed at a display provided at the man machine interface of the called terminal) may contain the name/photo of the calling subscriber and additionally also the available options for call control, such as accept/reject/divert the incoming call to voice mail, etc.

Instead of the service indication followed by the content retrieval request to the WAP server and the response from there to the user agent, one content push message from the WAP server to the user agent can be used.

Thus, upon combining the CNAP and WAP concepts, a more flexible CNAP feature can be implemented in that it is more user-friendly due to being customizable as a joint service and also, the proposed solution according to the above embodiments works even in case the calling subscriber is a fixed network subscriber.

Fourth Embodiment

In the above second and third embodiments, a database query has been made by the WAP user agent associated to the called terminal, or by the WAP server. Nevertheless, in any case, the database query has been made each time a call has been received from a calling terminal and the received name (obtained as a result of the database query) was presented to the called party before the phone as a terminal was answered.

This fourth embodiment is based on the idea that the (called) terminal has a memory means implemented, such as the repository shown in FIG. 1. However, every other memory means apart from the repository can be used as long as it is provided at the called party's terminal.

Then, each time the called terminal is called and a new pair of CLI (e.g. calling terminal's number A#, or URL address containing identification information) and identification information (name, photo and the like) is received, the pair of information is saved in the memory means provided at the called terminal's side, thereby constituting a terminal side name (or identification) database.

This means that at the terminal's side it is checked, whether a pair of data entries in the (local) terminal's database is identified and/or retrieved based on a CLI (telephone number and/or URL) received from the calling party.

If yes, this means that the calling party is known to the called terminal, and the identification information such as the name/photo of the calling party is retrieved/read out from the terminal's memory and indicated to the user of the called terminal via the man machine interface for call control.

If no, this means that the calling party is not yet known to the called terminal. In this case, a decision will be taken to initiate a database query of the "external" database associated to the calling terminal. The result of such an external database query is then presented to the user of the called terminal, and used to update or supplement the local database at the called terminal's side.

The decision as to whether a database query of the external database has to be effected and a subsequent database query can be taken by the WAP user agent, the SIM module of the terminal, or the terminal as such, i.e. the mobile station part as such of the terminal.

Among these, the WAP user agent alternative turns out to be most suitable. Namely, when the terminal as such is used for this purpose, USSD (Unstructured Supplementary Service Data) would have to be used as a bearer, so that a delay during call setup could become too long. Also, in case the SIM module is entrusted with these tasks, the SIM solution would be manufacturer dependent, so that a subscription to this service would require a new SIM card.

Finally, although throughout the above specification, there has been made reference to information identifying the calling terminal, this has to be understood as the information identifying the calling user/subscriber, since the IMEI (International Mobile Equipment Identity) is not being communicated.

Thus, as has been described hereinabove, the present invention proposes a method for call control by a called terminal device MS-B receiving a call via a communication network IN-NW for intelligent network services, said network IN-NW comprising a service control device SCP, CSE and a server device WAP-SERVER communicating with each other via an interface WAP-I/F, said service control device being connected to at least one service switching device SSP, MSC, HLR, VLR establishing communication via at least one radio access network RAN, BSS with said terminal device MS, and said terminal device MS being provided with a browsing means WAP-UA adapted to communicate with a user of said terminal device via a man machine interface means MMI, and adapted to communicate with said server device, the method comprising the steps of: triggering the presentation of information identifying a calling user of a terminal device (MS-A) to the called terminal device (MS-B) upon receipt of an incoming call; if triggered, presenting said information to a user of said called terminal device (MS-B) at said man machine interface (MMI) of said terminal device; collecting a user input via said man machine interface (MMI) in response to said presentation, and controlling said received call according to said collected user input. Accordingly, with the present invention being implemented, it becomes advantageously possible to provide a flexible and user friendly method of call control at the called terminal device. Moreover, with the present invention, the use of radio resources for call control signaling is limited to those allocated to the WAP bearer. Hence, there is a benefit that any other radio resources other than the WAP bearer are not used during such user interactions.

According to embodiments and modifications thereof, according to the present invention, it is also proposed above and/or at least conceivable that these are to be adapted such that said presenting step involves the retrieval of at least part of the identifying information from at least one server containing said identifying information;

said browser means issues the retrieval using an application programming interface to said terminal device;

said information identifying a calling user of a terminal device (MS-A) is a calling line identification information (CLIP);

said information identifying a calling user of a terminal device (MS-A) is a calling name identification information (CNAP);

said server is adapted to access a data base connected to said service control point (SCP, CSE), which data base contains said information identifying a calling user of a terminal device (MS-A);

said information contained in said database comprises at least one of the following information items: a name of the subscriber to said calling terminal device, a photo of the subscriber to said calling terminal device, and a web page address of said subscriber;

said triggering step comprises the steps of receiving a call establishment at said service switching device; and performing an inquiry to said service control device;

said triggering is effected by said service control device (SCP, CSE), said server device (WAP-SERVER), or said browsing means (WAP-UA);

said controlling comprises one of the following control actions: accepting, rejecting, diverting to voice mail of the incoming call;

said information identifying the calling user of the terminal is a URL;

said URL is communicated in a user-to-user signaling;

said URL is inquired from a service control device (SCP) of a calling party operator using the calling party number;

said URL is determined according to the calling party number consisting of at least a network operator prefix and a subscriber extension;

said calling user determines in a determination step whether, and, if yes, which URL is to be presented to the called user;

said URL is determined based on the called party's number comprising of at least a network operator prefix, a subscriber extension and an additional content included as a content selector;

a content addressed by said URL contains call control macro instructions which are expanded into executable content methods in a proxy server device or a WAP server device retrieving the URL;

said proxy server or said WAP server include a call control related part to calling user specified content;

said calling subscriber name is inquired from the browsing means via a USSD request issued by the browsing means;

said presentation step comprises the following steps: generating a content containing said identifying information in said terminal device or browser means;

said presentation step comprises the following steps: generating a content containing said identifying information, and pushing the content comprising said identifying information to the called terminal device (MS-B);

wherein said generation is performed in said server device or said service control means;

said pushing is performed using WTA service indication mechanism and content retrieval following it;

said pushing is performed using WAP content push mechanism;

said generating step comprises the following steps: composing at least one address to said identifying information, retrieving at least part of said identifying information from a server using said composed address;

said composing step involves the extraction of said address from call set-up information;

said composing step involves the retrieval of said address from a server providing mapping from pieces of call set-up information into addresses to said identifying information;

said composing step involves the deduction of the said address from call set-up information using syntax mapping;

said identifying information is appended with content for collecting said user input;

wherein said identifying information is content executable in said browser means (HTML, WAP, WML, JAVA);

said identifying information is translated by replacing abstract macro instructions into call instructions that can be issued to the terminal or to the service control device;

said identifying information is translated from a template document into content executable in said browser means containing also call control instructions that can be issued to the terminal or to the service control device;

said address is an internet URL;

said pieces of call set-up information include calling party number and/or content selector information included in the called party number;
said content selector is provided by the calling party by dialing a prefix to the called party number.

It should be understood that the above description and accompanying figures are merely intended to illustrate the present invention by way of example only. The preferred embodiments of the present invention may thus vary within the scope of the attached claims.

The invention claimed is:

1. A method for call control by a called terminal device (MS-B) receiving a call via a communication network (IN-NW) for intelligent network services, said network (IN-NW) comprising
a service control device and a server device (WAP-SERVER) communicating with each other via an interface (WAP-I/F),
said service control device being connected to at least one service switching device establishing communication via at least one radio access network (RAN, BSS) with said terminal device (MS), and
said terminal device (MS) being provided with a browsing means adapted to communicate with a user of said terminal device via a man machine interface means (MMI), and adapted to communicate with said server device, the method comprising the steps of:
receiving (S22) an incoming call at said service switching device,
triggering (S23) a presentation service at said service control device;
if triggered, retrieving (S24–S26) information identifying a calling user of a terminal device (MS-A) from an external server;
providing (S27–S29) said information identifying said calling user of a terminal device (MS-A) to said called terminal device (MS-B);
presenting (S30a) said information identifying said calling user of a terminal device (MS-A) at a browsing means of said man machine interface of said terminal device;
collecting (S31) a user input via said man machine interface (MMI) in response to said presentation,
providing (S32) information on said collected user input to said service control device, and
controlling (S33, S34) said received call by said service control device according to said collected user input.

2. A method according to claim 1, wherein
said presenting step involves the retrieval of at least part of the information identifying a calling user of a terminal device (MS-A) from at least one server containing said information.

3. A method according to claim 2, wherein
said browser means uses an application programming interface to said terminal device.

4. A method according to claim 1, wherein
said information identifying a calling user of a terminal device (MS-A) is a calling line identification information (CLIP).

5. A method according to claim 1, wherein
said information identifying a calling user of a terminal device (MS-A) is a calling name identification information (CNAP).

6. A method according to claim 2, wherein
said server is adapted to access a data base connected to said service control point, which data base contains said information identifying a calling user of a terminal device (MS-A).

7. A method according to claim 6, wherein
said information contained in said database comprises at least one of the following information items: a name of a subscriber to said calling terminal device, a photo of the subscriber to said calling terminal device, and a web page address of said subscriber.

8. A method according to claim 1, wherein
said triggering step comprises the steps of
receiving a call establishment at said service switching device; and
performing an inquiry to said service control device.

9. A method according to claim 1, wherein
said triggering is effected by said service control device, said server device (WAP-SERVER), or said browsing means.

10. A method according to claim 1, wherein
said controlling comprises one of the following control actions: accepting, rejecting, diverting to voice mail of the call.

11. A method according to claim 1, wherein
said information identifying the calling user of the terminal is a URL.

12. A method according to claim 11, wherein
said URL is communicated in a user-to-user signaling.

13. A method according to claim 11, wherein
said URL is inquired from a service control device of a calling party operator using a calling party number.

14. A method according to claim 11, wherein
said URL is determined according to a calling party number comprising at least a network operator prefix and a subscriber extension.

15. A method according to claim 11, wherein
said calling user determines in a determination step whether, and, if yes, which URL is to be presented to the browsing means.

16. A method according to claim 11, wherein
said URL is determined based on a called user number comprising at least a network operator prefix, a subscriber extension and an additional content included as a content selector.

17. A method according to claim 11, wherein
a content addressed by said URL contains call control macro instructions which are expandable into executable content methods in a proxy server device or a WAP server device retrieving the URL.

18. A method according to claim 17, wherein
said proxy server or said WAP server include a call control related part to calling user specified content.

19. A method according to claim 7, wherein
said name of the subscriber to said calling terminal device (MS-A) is inquired from the browsing means via a USSD request issued by the browsing means.

20. A method according to claim 1, wherein
said presenting step comprises the step of:
generating a content containing said information identifying said calling user in said terminal device or browser means.

21. A method according to claim 1, wherein said presenting step comprises the following steps:
generating a content containing said information identifying said calling user, and pushing the content comprising said information identifying said calling user to the called terminal device (MS-B).

22. A method according to claim 21, wherein said generating is performed in said server device or said service control means.

23. A method according to claim 21, wherein said pushing is performed using WTA service indication mechanism and content retrieval following it.

24. A method according to claim 21, wherein said pushing is performed using WAP content push mechanism.

25. A method according to claim 20, wherein said generating step comprises the following steps:
composing at least one address to said information identifying said calling user,
retrieving at least part of said information from a server using said address.

26. A method according to claim 25, wherein said composing step involves extraction of said address from call set-up information.

27. A method according to claim 25, wherein said composing step involves retrieval of said address from a server providing mapping from pieces of call set-up information into addresses to said information identifying said calling user.

28. A method according to claim 25, wherein said composing step involves deduction of said address from call set-up information using syntax mapping.

29. A method according to claim 21, wherein said information identifying said calling user is appended with content for collecting said user input.

30. A method according to claim 1, wherein said identifying said calling user is content executable in said browser means.

31. A method according to claim 21, wherein said information identifying said calling user is translated by replacing abstract macro instructions into call instructions for the terminal or the service control device.

32. A method according to claim 21, wherein said information identifying said calling user is translated from a template document into content executable in said browser means containing also call control instructions for the terminal or the service control device.

33. A method according to claim 27, wherein said address is an internet URL.

34. A method according to claim 27, wherein said pieces of call set-up information include calling party number and/or content selector information included in a called number of the called terminal device.

35. A method according to claim 34, wherein said content selector is provided by the calling user by dialing a prefix to the called number.

* * * * *